(12) United States Patent
Yamamoto

(10) Patent No.: US 6,686,967 B1
(45) Date of Patent: Feb. 3, 2004

(54) LOW-ANGLE GRIP DEVICE FOR AN ENG CAMERA

(75) Inventor: Shigeru Yamamoto, Saitama (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 09/144,333

(22) Filed: Aug. 31, 1998

(30) Foreign Application Priority Data

Aug. 29, 1997 (JP) .............................................. 9-234974
Sep. 17, 1997 (JP) .............................................. 9-252219

(51) Int. Cl.[7] .............................................. H04N 5/225
(52) U.S. Cl. ................................... 348/373; 348/211.4
(58) Field of Search ................................. 348/373, 375, 348/376, 211, 722, 211.4, 211.7, 211.99; 396/535, 540, 541

(56) References Cited

U.S. PATENT DOCUMENTS

| | | | | |
|---|---|---|---|---|
| 4,236,794 A | * | 12/1980 | Gordon ........................ 348/347 |
| 4,407,437 A | * | 10/1983 | Takubo ........................ 224/265 |
| 4,531,159 A | * | 7/1985 | Takubo et al. ............... 348/335 |
| 4,668,992 A | * | 5/1987 | Bachmann et al. .......... 348/335 |
| 5,081,478 A | * | 1/1992 | Hayashida et al. .......... 248/187.1 |
| 5,121,147 A | * | 6/1992 | Wada et al. ................. 348/375 |
| 5,208,675 A | * | 5/1993 | Wilson et al. ............... 348/370 |
| 5,469,271 A | * | 11/1995 | Hoshino et al. ............. 358/335 |
| 5,572,252 A | * | 11/1996 | Naka et al. ................. 348/208.16 |
| 5,633,680 A | * | 5/1997 | Kaneko et al. .............. 348/357 |
| 5,767,906 A | * | 6/1998 | Toyofuku et al. ........... 348/333.06 |
| 5,790,194 A | * | 8/1998 | Shimamura .................. 348/375 |
| 5,801,774 A | * | 9/1998 | Seo ........................... 348/333.06 |
| 5,884,107 A | * | 3/1999 | Yajima ....................... 348/357 |

\* cited by examiner

Primary Examiner—Andrew Christensen
Assistant Examiner—Eric Wisdahl
(74) Attorney, Agent, or Firm—Young & Thompson

(57) ABSTRACT

A low-angle grip device for holding an ENG camera in desired low-angle positions comprises a grip rod supported at opposite ends by front and rear fixtures secured to the ENG camera body and a camera lens controlling member operated with a thumb of a hand by which the grip rod is grasped. The grip rod at one of its opposite ends is pivotally supported on one of the front and rear fixture, and the grip rod at the other end is tilted upward or downward about the one end by a desired angle and is engaged by the other fixture in the tilted position.

7 Claims, 15 Drawing Sheets

LOW-ANGLE GRIP DEVICE FOR AN ENG CAMERA

BACKGROUND OF THE INVENTION

1. Field of the Invention

This invention relates to a low-angle grip device for an electronic news gathering (ENG) camera and, more particularly, to a low-angle grip device equipped with a remote controlling member for remotely controlling an ENG camera for holding the ENG camera in desired low-angle positions.

2. Description of Related Art

A wide variety of electronic news gathering cameras have been widely used as portable television cameras to gather news on a spot. While such an ENG camera is usually borne on a reporter's shoulder during taking pictures of a scene, it is necessary to hold the ENG camera in low-angle or dog-eye shooting positions. In order to enable the photographer to hold the ENG camera in a low-angle position, the ENG camera is equipped with what is called a low-angle grip detachably or fixedly secured to the top of the ENG camera. Some of low-angle grips of this kind are provided with a remote controlling member in the form of thumb ring, such as a zoom rate controlling ring, for remotely controlling the ENG camera with a finger of the hand by which the grip is grasped.

Because, typically, the low-angle grip is attached to the top of an ENG camera in parallel to the optical axis of the ENG camera, in order to put the ENG camera tilted up or down, it is necessary for the photographer to grasp the low-angle grip by one hand with its wrist bent forward or backward, which always compels the photographer to stand in an unnatural position and makes it hard for the photographer to continue low-angle shooting of a subject in the unnatural position for a long time.

SUMMARY OF THE INVENTION

It is accordingly an object of the invention to provide a low-angle grip device for holding an ENG camera in a desired low-angle position which comprises a grip rod, remote control means installed to a front end portion of the grip rod and electrically connected to the motor drive unit for remotely driving the camera lens system, and grip rod support means secured to the ENG camera for adjusting an angular position of the grip rod relative to an optical axis of the camera lens system and supporting the grip rod in the adjusted angular position.

According to the low-angle grip device of the invention, the grip rod is adjustable in angle relative to the optical axis of the ENG camera, and consequently the ENG camera is held in desired low-angle positions suitably to shoot a subject downward or upward by gripping the grip rod 20 horizontally by a hand. As a result, the photographer can continue low-angle shooting of a subject for a long time without standing in an unnatural position. Further, the zoom ring is operated easily with the thumb of a hand by which the grip rod is grasped.

A low-angle grip device for holding an ENG camera in a desired low-angle position according to another embodiment of the invention comprises a grip rod fixedly supported at front and rear ends by grip rod support means which is detachably and slidably mounted on a base adapter detachably secured to the top of the ENG camera.

According to the ENG camera low-angle grip device of the other embodiment of the invention, the low-angle grip device is shifted to any desired position forward or backward with respect to the center of gravity of the ENG camera. Further, since the low-angle grip device is detachably mounted on the base adapter, it is widely applied to different ENG cameras having different shapes by preparing said base adapters fitted to the shapes of ENG cameras.

BRIEF DESCRIPTION OF THE DRAWINGS

The above and other objects and features of the present invention will be understood from the following description of a specific embodiment thereof when considering in conjunction with the accompanying drawings, in which.

DETAILED DESCRIPTION OF THE SPECIFIC EMBODIMENT

Figure 1:
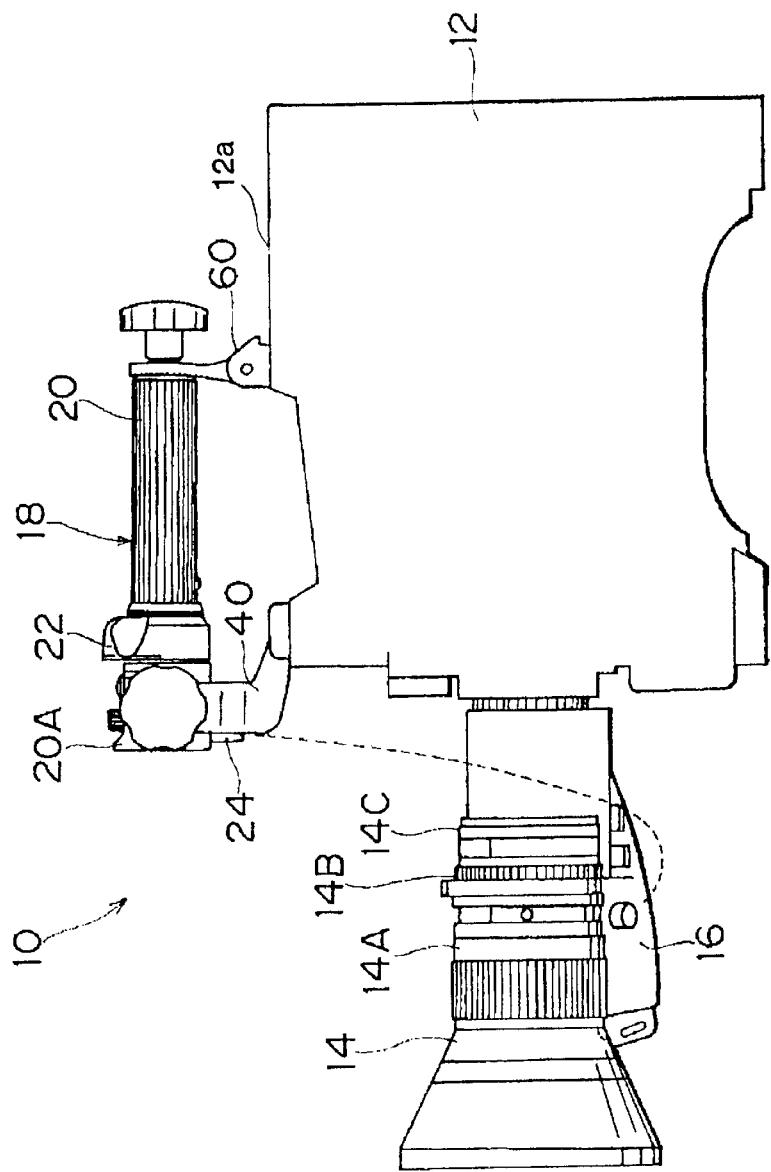
FIG. 1 is a side view of an electronic news gathering (ENG) camera equipped with a low-angle grip device in accordance with an embodiment of the invention.

Referring to the drawings in detail, in particular, to FIG. 1 showing an electronic news gathering (ENG) camera 10 equipped with a low-angle grip device 18 in accordance with an embodiment of the invention, ENG camera 10 is comprised of a camera body 12 and a zoom lens 14. The camera body 12 includes therein an electronic image pick up device and a magnetic video recording device or an electronic video floppy device. The zoom lens 14, which is of a motor driven type, comprises an optical zoom lens system and a variable aperture element (not shown) and is equipped with various setting rings, namely a focus setting ring 14A, a zooming ring 14B and an aperture setting ring 14C. A motor drive unit 16 incorporating a servo motor (not shown) is attached to the zoom lens 14 to drive the optical zoom lens system and the aperture element in response to operation of each setting ring 14A, 14B, 14C through a mechanical linkage. In addition to remote operation by means of the motor drive unit 16, the zoom lens 14 is operated manually by directly operating the setting rings 14A, 14B and 14C, independently. For switching the zoom lens 14 between the motor drive mode and the manual mode, the motor drive unit 16 is provided with a switching button 16a to disconnect the mechanical linkage between the servo motor and the setting rings 14A, 14B and 14C.

The camera body 12 is equipped with the low-angle grip device 18 attached to the top 12a thereof. The low-angle grip device 18 comprises a grip bar 20, a thumb ring or remote zooming ring 22 mounted for rotation on the front end portion of the grip rod 20 and an angular position sensor 20A fixedly attached to the front end of the grip rod 20. The grip rod 20 at its opposite ends is fixed to the camera body 12 by means of front and rear fixtures 40 and 60. The position sensor 20A incorporates a potentiometer (not shown) to detect an angular position of the remote zoom ring 22. The low-angle grip device 18 thus structured is attached to the camera body 12 by means of the front and rear fixtures 40 and 60. The remote zooming ring 22 cooperates with the angular position sensor 20A to transmit a signal representative of a rotational angular position and a speed of rotation of the remote zooming ring 22 to the motor drive unit 16 through a communication cable 24. The servo motor is driven by an angle at a speed according to the incoming signal from the angular position sensor 20A to drive the remote zooming ring 14B.

For low-angle photography, the photographer grasps the grip rod 20 by a hand and holds the ENG camera 10 down closely to the ground. During taking a picture, the photographer operates the remote zooming ring 22 clockwise or counterclockwise as viewed in FIG. 2 with the thumb of the hand to drive the zoom lens 14 for zooming.

Figure 2:
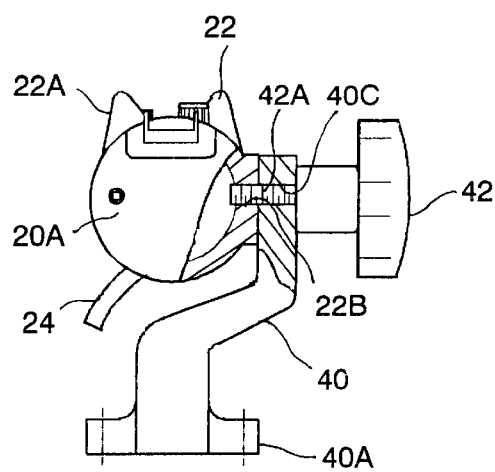
FIG. 2 is front view of the low-angle grip device.
Figure 3:
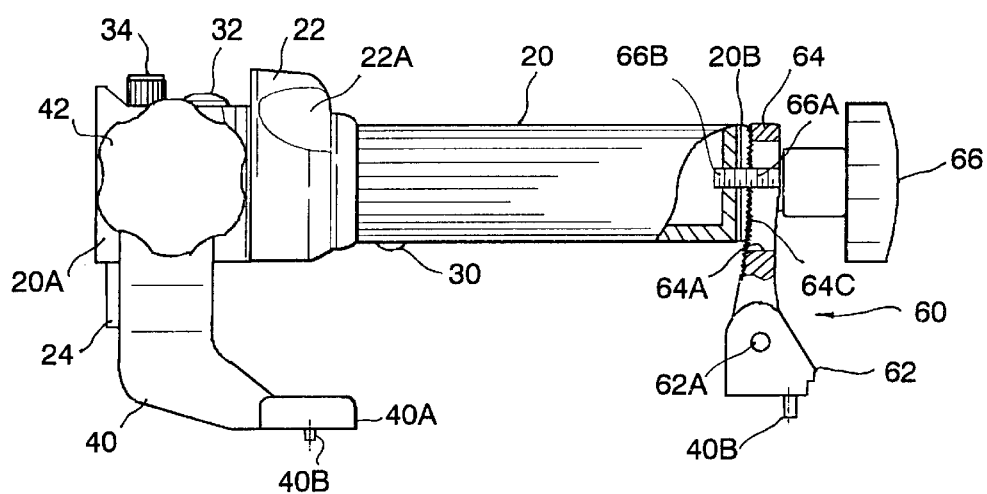
FIG. 3 is a side view of the low-angle grip device.
Figure 4:
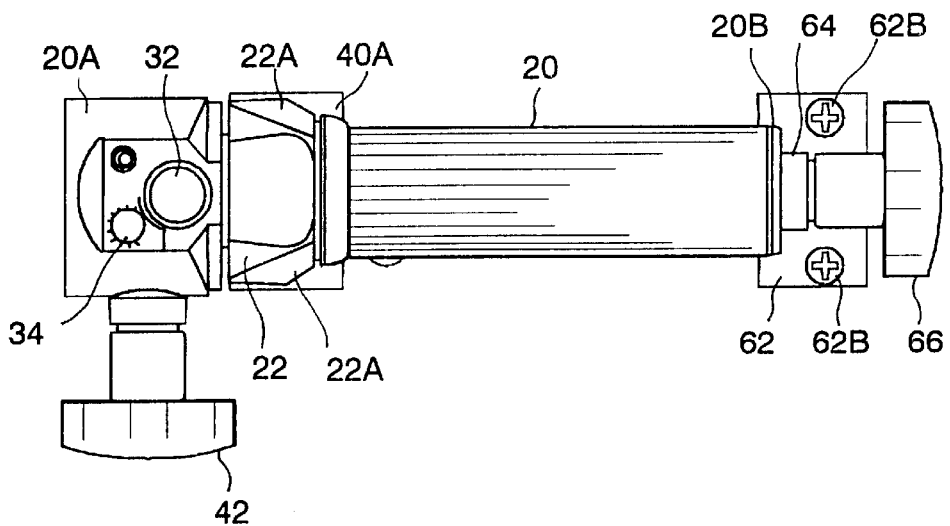
FIG. 4 is a top view of the low-angle grip device.

Referring to FIGS. 2 through 4 showing the low-angle grip device 18 in detail, the remote zooming ring 22 is formed with a finger stop 22A at the top and/or opposite sides for easy operation. When turning the remote zooming ring 22 with the thumb, the angular position sensor 20A detects a rotational angle of the remote zooming ring 22 and sends a signal representative the rotational angle changing according to operation of the remote zooming ring 22 to the motor drive unit 16 through the communication cable 22. As shown in FIG. 3, the low-angle grip device 10 is further provided with a return switch 30 installed to the under side of the grip rod 20, a VCR switch 32 and a speed control dial 34 installed to the top of the angular position sensor 20A. The switches and dial are electrically connected to the motor drive unit 16 through the communication cable 24.

The front fixture 40 for fixing the low-angle grip device 18 to the ENG camera body 12 is formed with a hole 40C at its upper portion and provided with set screws 40B held at its lower leg portion 40A. The front fixture 40 is secured to the top of the ENG camera body 12 by fastening the set screws 40B. A front fixture knob 42 having a threaded rod 42A is fastened to a threaded bore 22B formed in a side wall of the position sensor 20A to secure the position sensor 20A, and hence, the front end of the grip rod 22, to the front fixture 40. When loosening the front fixture knob 42 slightly, the grip rod 22 can be turned up or down with respect to the fixture 40. The rear fixture 60 for fixing the low-angle grip device 18 to the ENG camera body 12 is comprised of a support base 62 and a generally U-channeled vertical post 64 pivotally mounted on the support base 62. The support base 62 is provided with set screws 63B held thereby. The generally U-channeled vertical post 64 is formed with a vertical slot 64A and saw-toothed vertical edges 64C. The rear fixture 60 is secured to the top of the ENG camera body 12 by fastening the set screws 62B. A rear fixture knob 66 having a threaded rod 66A is passed through the vertical slot 64A of the vertical post 64 and fastened to a threaded bore 20B formed at the rear end of the grip rod 20 to force the vertical post 64 of the rear fixture 60 against the rear end 20B of the grip rod 20. In this manner, the low-angle grip device 18 is attached to the ENG camera body 12 by means of the front and rear fixtures 40 and 60.

After loosening the front and rear fixture knob 42 and 66 and pushing up the rear end of the grip rod 20 upward to incline the grip rod 20 relative to the ENG camera body 12, the front and rear fixture knob 42 and 66 are fastened again to fix the grip rod 20 in the inclined position. Inclination of the grip rod 20 can be adjusted within an extent of the vertical slot 64A of the rear fixture 60. Because the saw-toothed vertical edges 64C of the vertical post 64 of the rear fixture 60 is forced against the rear end of the grip rod 20, the grip rod 20 is prevented from sliding off the inclined position even when the ENG camera body 12 is violently shaken up and down with the grip rod 20 remaining held by a hand. The grip rod 20 may be preferably provided with an elastic pad secured to the end thereof or saw-teeth on the rear end thereof to provide more secure protection against sliding off the position due to violent up and down shakes of the ENG camera body 12.

Figure 5:
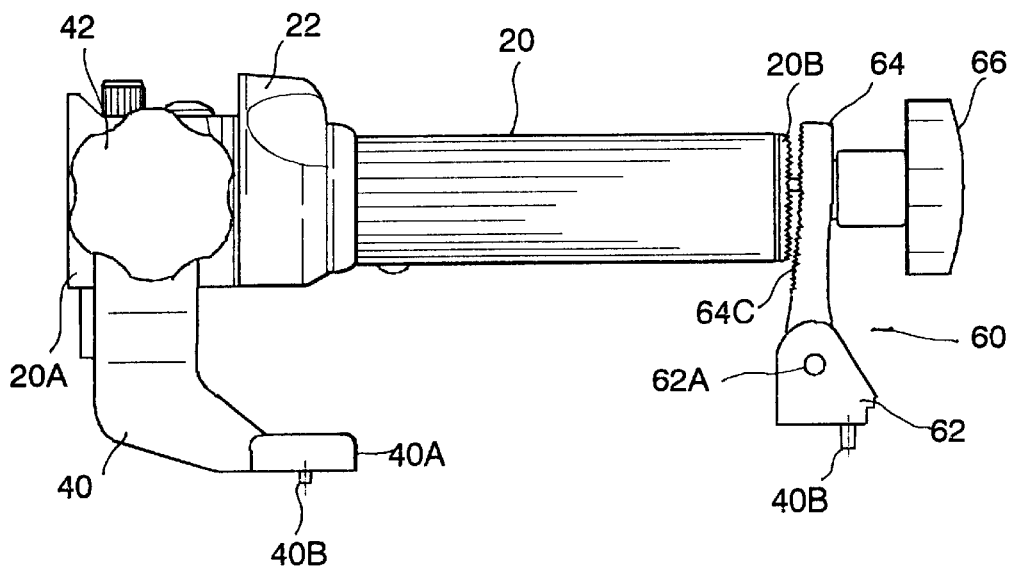
FIG. 5 is an explanatory view, similar to FIG. 3, of the low-angle grip device for explanation of tilting the low-angle grip device up or down relative to the optical axis of the ENG camera.
Figure 6:
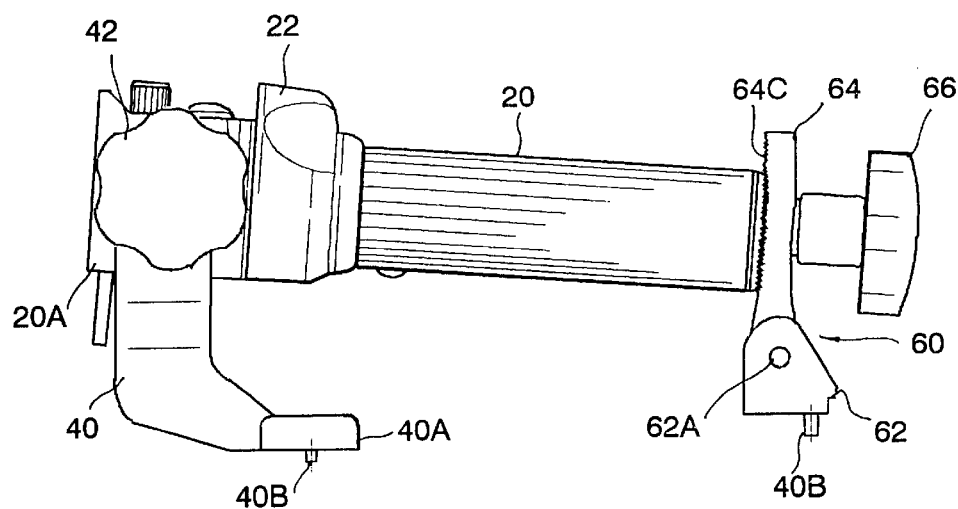
FIG. 6 is a side-view of the low-angle grip device tilted up relative to the optical axis of the ENG camera.
Figure 7:
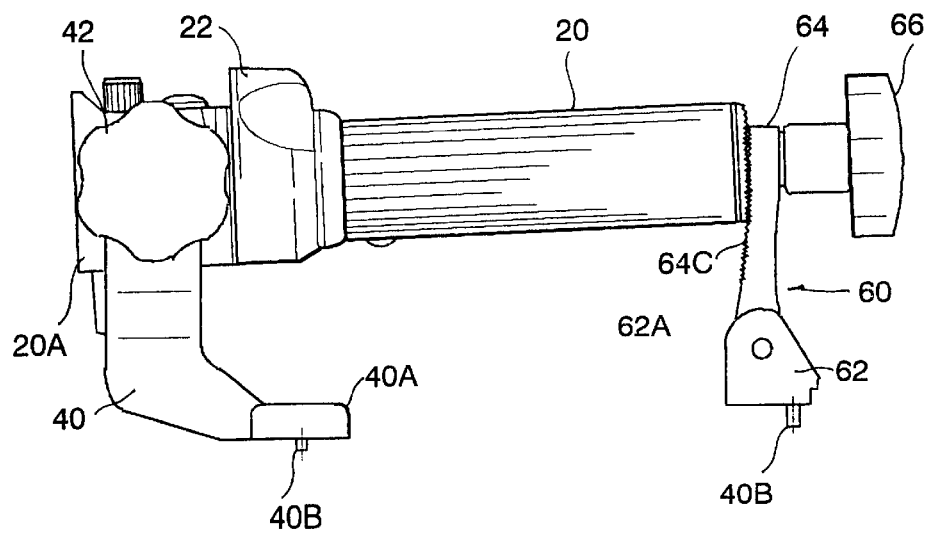
FIG. 7 is a side-view of the low-angle grip device tilted down relative to the optical axis of the ENG camera.

Referring to FIG. 5, when changing the position of the low-angle grip device 18, the front and rear fixture knob 42 and 66 are loosened, As a result of which the vertical post 64 of the rear fixture 60 is allowed to be turned clockwise as viewed in FIG. 5, separated backward about the pivot shaft 62A and the grip rod 20 allowed to be turned upward or downward about the threaded rod 42A of the front fixture knob 42. After turning the vertical post 64 of the rear fixture 60 slightly clockwise, the grip rod 20 at its rear end 20B is pushed upward or downward to be turned about the threaded rod 42A of the front fixture knob 42. Specifically, the grip rod 20 is turned clockwise when there is a demand for holding the ENG camera 10 with the optical axis inclined backward by holding the low-angle grip device 18 horizontally by a hand as shown in FIG. 6, or turned counterclockwise as shown in FIG. 7 when there is a demand for holding the ENG camera 10 with the optical axis inclined forward by holding the low-angle grip device 18 horizontally by a hand. After adjusting the angular position of the grip rod 20 with respect to the ENG camera body 12, the rear fixture knob 66 is fastened first to force the saw-toothed vertical edges 64C of the vertical post 64 of the rear fixture 60 against the rear end 20B of the grip rod 20, and then the front fixture knob 42 is fastened.

The grip rod 20 at its front end may be hinged pivotally supported on the front fixture 40 in place of being secured by the front fixture knob 42. Further, the front and rear fixtures 40 and 60 may be replaced in structure with each other so as to permit the grip rod 20 to turn counterclockwise as viewed in, for example, FIG. 1 about its rear end.

As described above, according to the low-angle grip device 18 which adjustable in angle relative to the ENG camera body 12, i.e. the optical axis of the ENG camera 10, the ENG camera 10 is held in low-angle position suitably to shoot a subject downward or upward by grasping the grip rod 20 horizontally by a hand. As a result, the photographer can continue low-angle shooting of a subject for a long time without standing in an unnatural position. Further, the remote zooming ring 22 is operated easily with the thumb of a hand by which the grip rod 20 is grasped.

Figure 8:
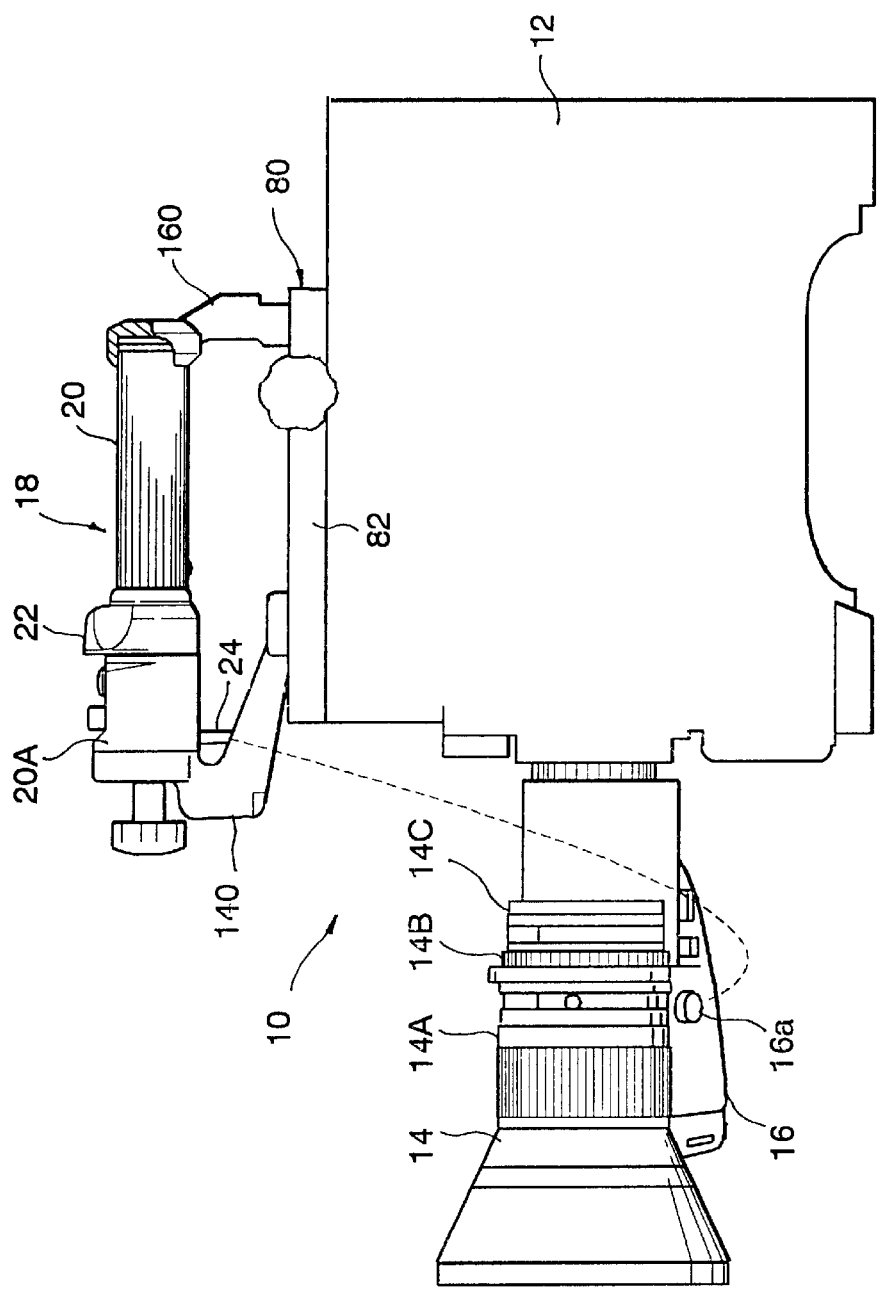
FIG. 8 is a side view of a low-angle grip device in accordance with another embodiment of the invention which is attached to an ENG camera.
Figure 11:
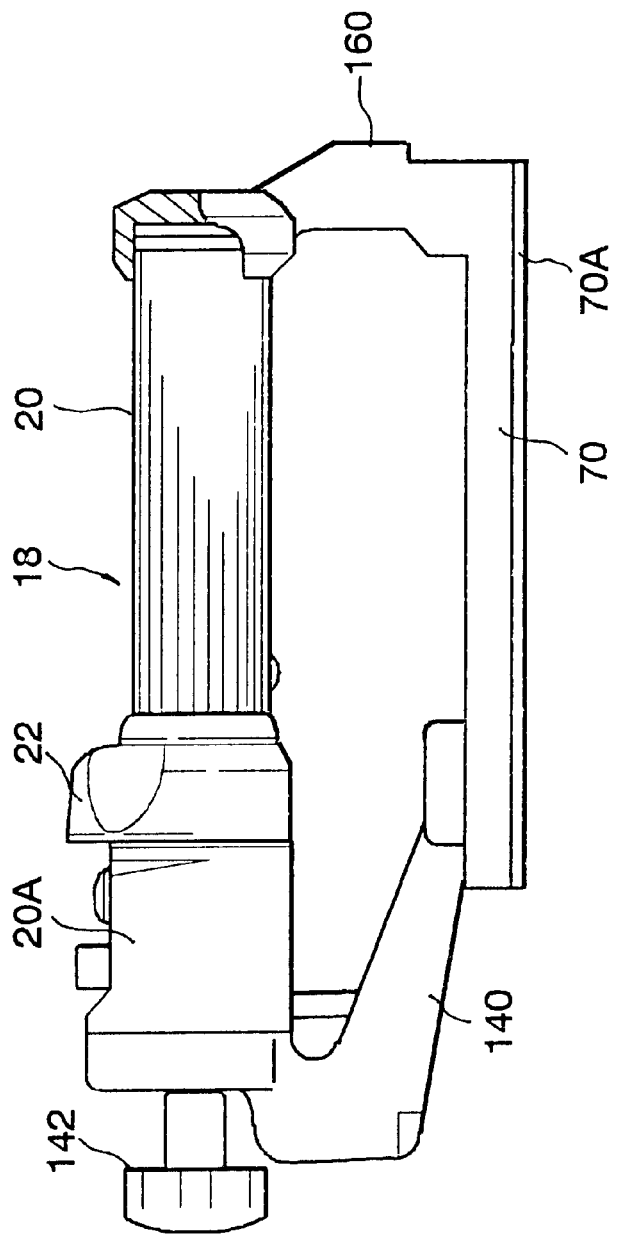
FIG. 11 is a side view of a fixture of the low-angle grip device.
Figure 12:
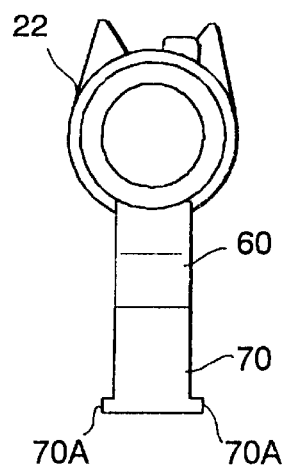
FIG. 12 is a rear view of the fixture of the low-angle grip device.
Figure 13:
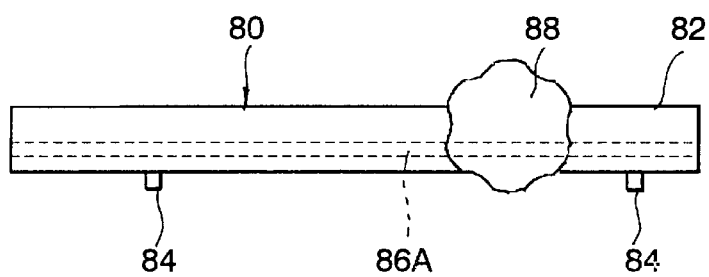
FIG. 13 is a side view of an adapter for the low-angle grip device.

Referring to FIG. 8 showing a low-angle grip device 18 in accordance with another embodiment of the invention which is shiftable in axial direction relative to an ENG camera body 12, the low-angle grip device 18 comprises a grip rod 20, a thumb ring or remote zooming ring 22 formed with a finger stop 22A mounted for rotation on the front end portion of the grip rod 20 and an angular position sensor 20A fixedly attached to the front end of the grip rod 20. The angular position sensor 20A is disposed coaxially with and adjacent to the remote zooming ring 22. The grip rod 20 at its opposite ends is supported by means of front and rear supports 140 and 160 connected as one whole by means of a flanged base slider 70 (see FIG. 11). The position sensor 20A incorporates a potentiometer (not shown) to detect an angular position of the remote zooming ring 22. The low-angle grip device 18 is further provided with a return switch 30 installed to the under side of the grip rod 20, a VCR switch 32 and a speed control dial 34 installed to the top of the angular position sensor 20A. The remote zooming ring 22 cooperates with the angular position sensor 20A to transmit a signal representative of a rotational angular position and a speed of rotation of the remote zooming ring 22 to a motor drive unit 16 through a communication cable 24. The servo motor in the motor drive unit 16 is driven by an angle at a speed according to the incoming signal from the angular position sensor 20A to drive the remote zooming ring 14B. The switches 30 and 32 and the dial 34 are electrically connected to the motor drive unit 16 through the communication cable 24.

Figure 9:
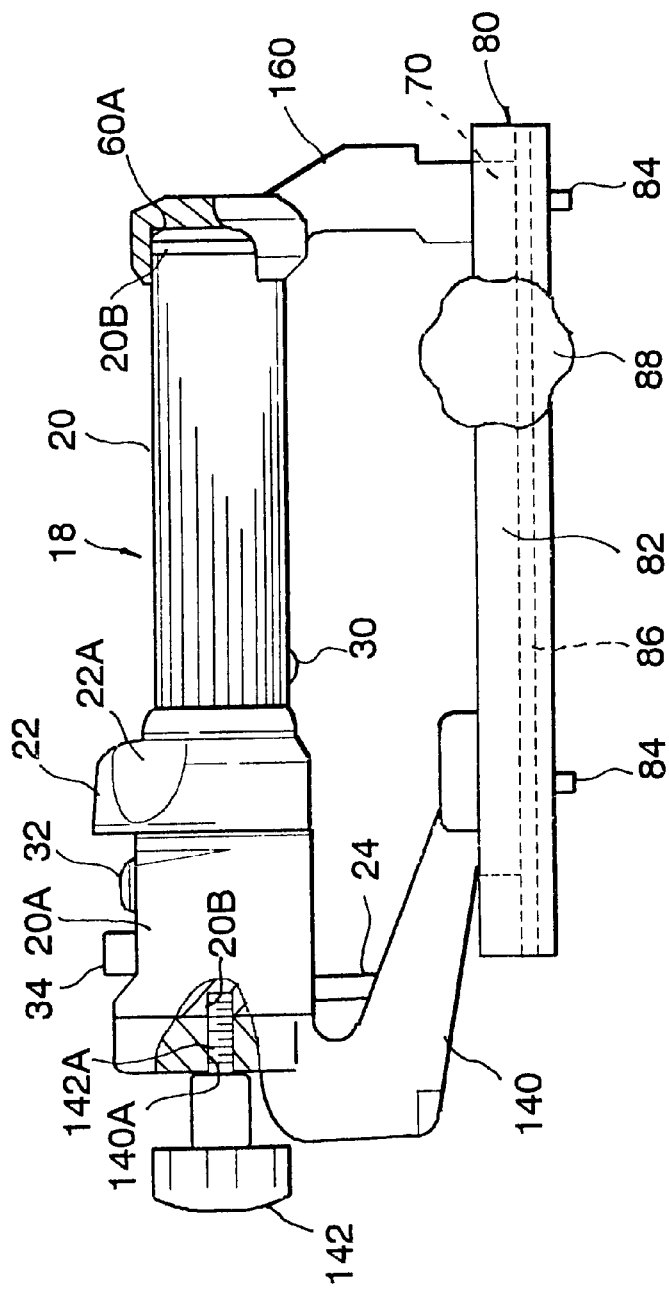
FIG. 9 is a side view of the low-angle grip device.
Figure 10:
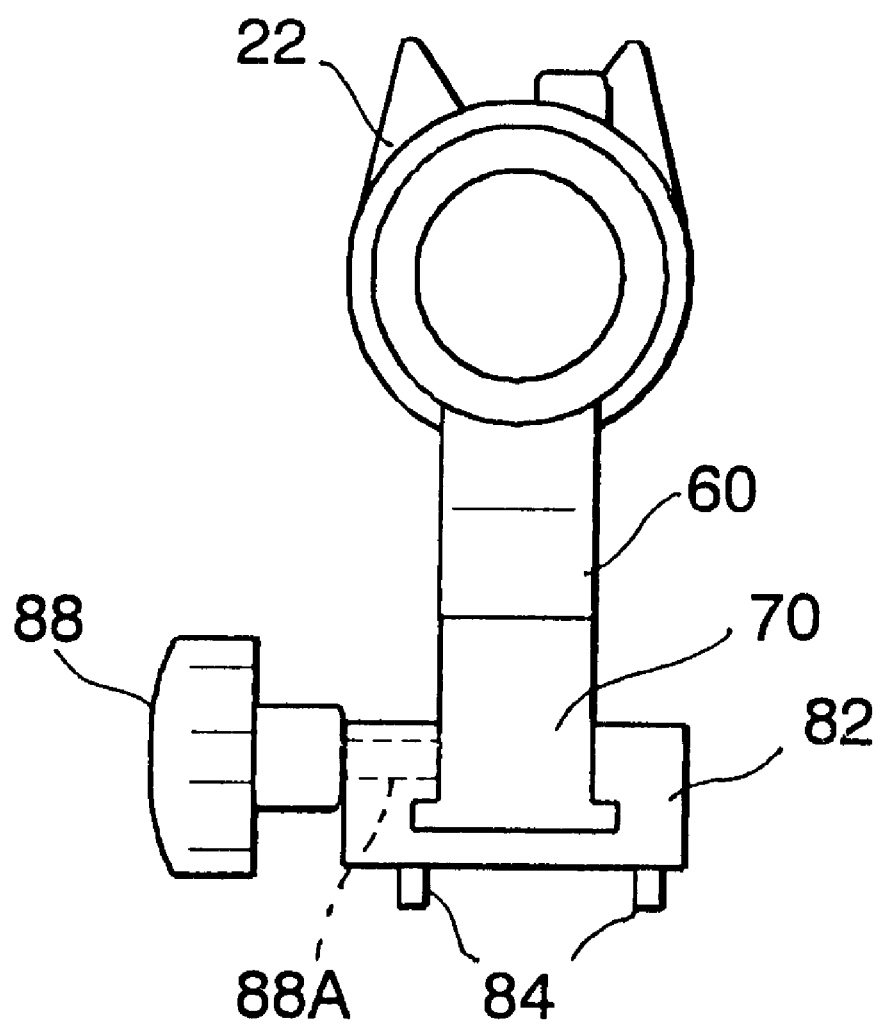
FIG. 10 is a rear view of the low-angle grip device.

FIGS. 9 and 10 show the low-angle grip device in detail. The front support 140 for supporting the front end of the low-angle grip device 18 is formed with a bore 140A at its upper portion. A front fixture knob 142 having a threaded rod 142A is fastened to a threaded bore 20B formed in a front wall of the angular position sensor 20A to secure the angular position sensor 20A, and hence the front end of the grip rod 22, to the front support 140. The rear support 10 for supporting the rear end of the low-angle grip device 18 is formed with a circular fixing recess 160A at its upper end. The grip rod 20 at its rear end is fitted in the circular fixing recess 160 to be supported by the rear support 160. Each of the front and rear supports 140 and 150 is supported by an adapter device 80 so as to slide back and forth on it.

Figure 14:
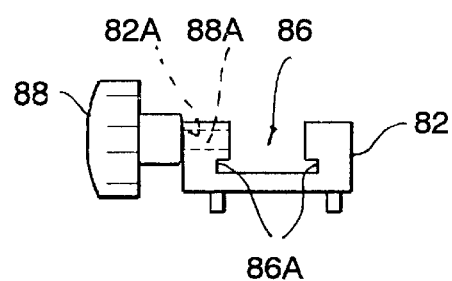
FIG. 14 is a rear view of the adapter for the low-angle grip device.

The adapter 80 comprises a base guide rail 82 and a fixing knob 88. The base guide rail 82 is formed with a generally T-shaped guide groove 86 in which the base slider 70 slides and provided with set screws 84. The fixing knob 88 is provided with a threaded rod 88A which is fastened into a threaded bore 82A (see FIG. 14) of the base guide rail 82 to lock the base slider 70 of the front and rear supports 140 and 160 in a desired position. The adapter 80 shaped to be adaptable to the top of the ENG camera body 12 and is secured to the top of the ENG camera 12 by fastening the set screws 84. The low-angle grip device 18 is adjusted in axial direction according to the center of gravity of the ENG camera body 12 by sliding the base slider 70 of the front and rear supports 140 and 160 on the base guide rail 82 of the adapter 80.

As shown in detail in FIGS. 11 through 14, the low-angle grip device 18 includes the front and rear supports 140 and 160 connected as one whole by the base slider 70 provided with side flanges 70A at opposite sides, and the adapter 80 has the base guide rail 82 formed with the T-shaped guide groove 86 in which the flanged base slider 70 slides. These three parts 140, 160 and 70 may be formed as one integral part. Otherwise, the rear support 160 and the base slider 70 may be formed as one integral part, and in such a case, the front support 140 is prepared as a separate part and secured to the base slider 70 by fastening means in a desired position according to an axial length of the grip rod 20. The set screws 84 pass through bores formed in the bottom wall of the base guide rail 82 and fastened into the ENG camera body 12. The guide groove 86 extends along the whole length of the base guide rail 82. When inserting the side flanges 70A of the base slider 70 into the side grooves 86A from the front or the back, the side flanges 70A of the base slider 70 fit firmly and the base slider 70 is allowed to smoothly slide in the T-shaped groove 86. The base guide rail 82 is formed with a threaded bore 82A in one of its side walls which is engaged by the threaded rod 88A of the fixing knob 88. The fixing knob 88 is fastened into the threaded bore 82A until the threaded rod 88A strongly forces against the base slider 70 to fix the low-angle grip device 18 in a desired axial position relative to the ENG camera body 12.

Figure 15:
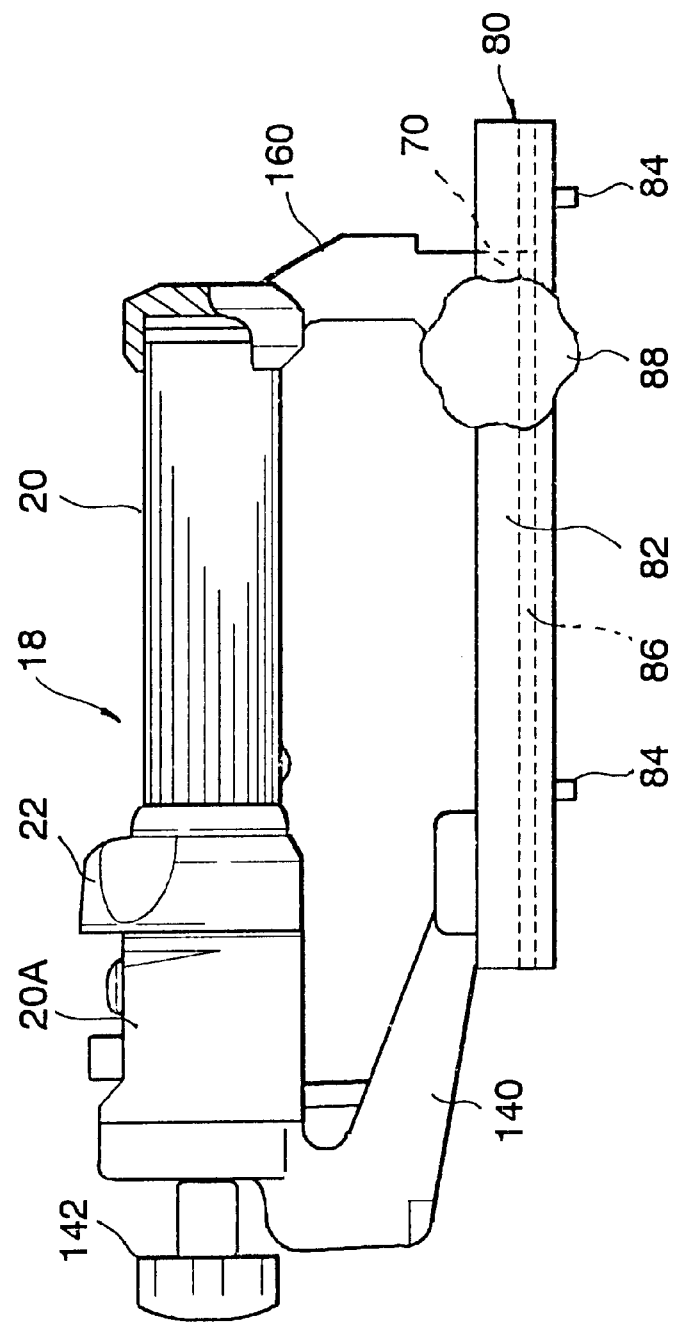
FIG. 15 is a side view of the low-angle grip device attached to the adapter in different position relative to that shown in FIG. 8.

The low-angle grip device 18 thus constructed is adjusted in position relative to the ENG camera 10 even when the center of gravity of the ENG camera 10 shifts according to different weights of zoom lenses 14 attached to the ENG camera body 12. Accordingly, the photographer holds the ENG camera 10 in a well balanced position by grasping the grip rod 20 horizontally. When attaching the low-angle grip device 18 to the ENG camera body 12 such that the center of gravity of the ENG camera 10 is set off forward or backward relative to the low-angle grip device 18, the photographer is enabled to tilt the ENG camera 10 desirably downward or upward with less wrist force. For example, as shown in FIG. 15, the low-angle grip device 18 shifted forward relative to the ENG camera body 12 enables the photographer to tilt the ENG camera 10 upward even by grasping the grip rod 20 without so much tilting effort. If preparing various adapters shaped to fit different tops of ENG camera bodies, respectively, the low-angle grip device 18 of the invention is available for the different ENG cameras.

Figure 16:
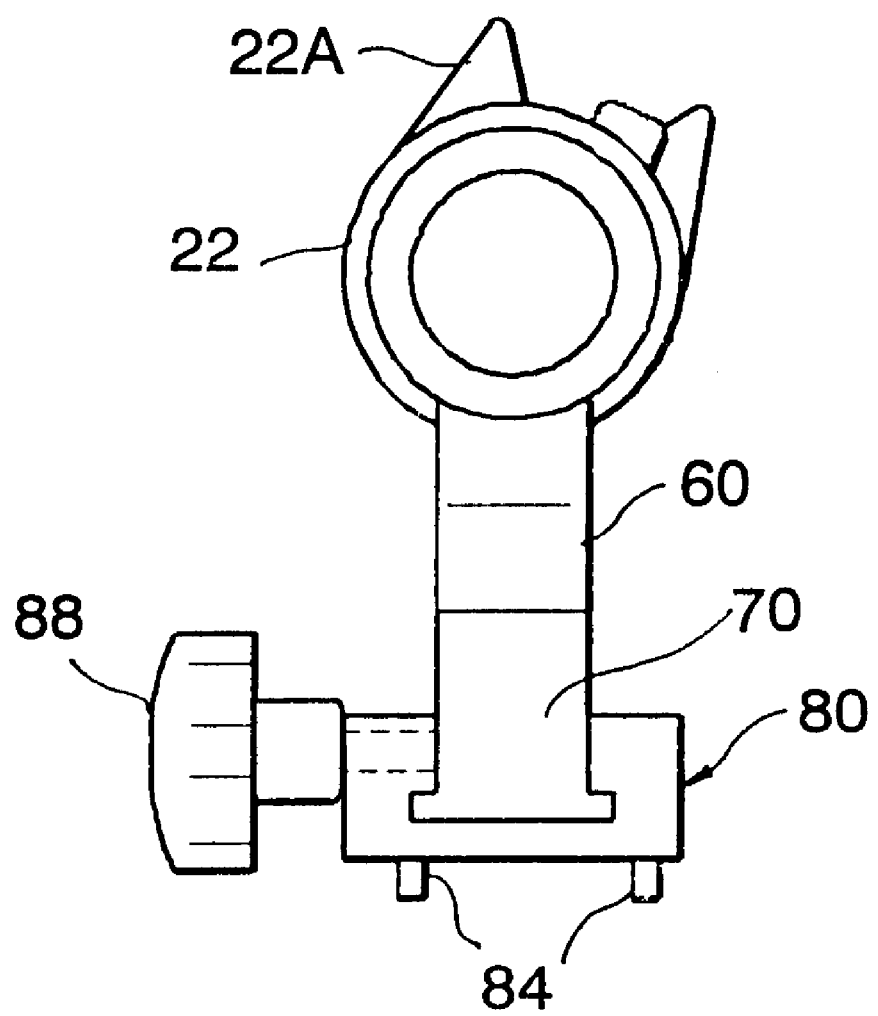
FIG. 16 is a rear view of the low-angle grip device with a zooming ring changed in angular position.
Figure 17:
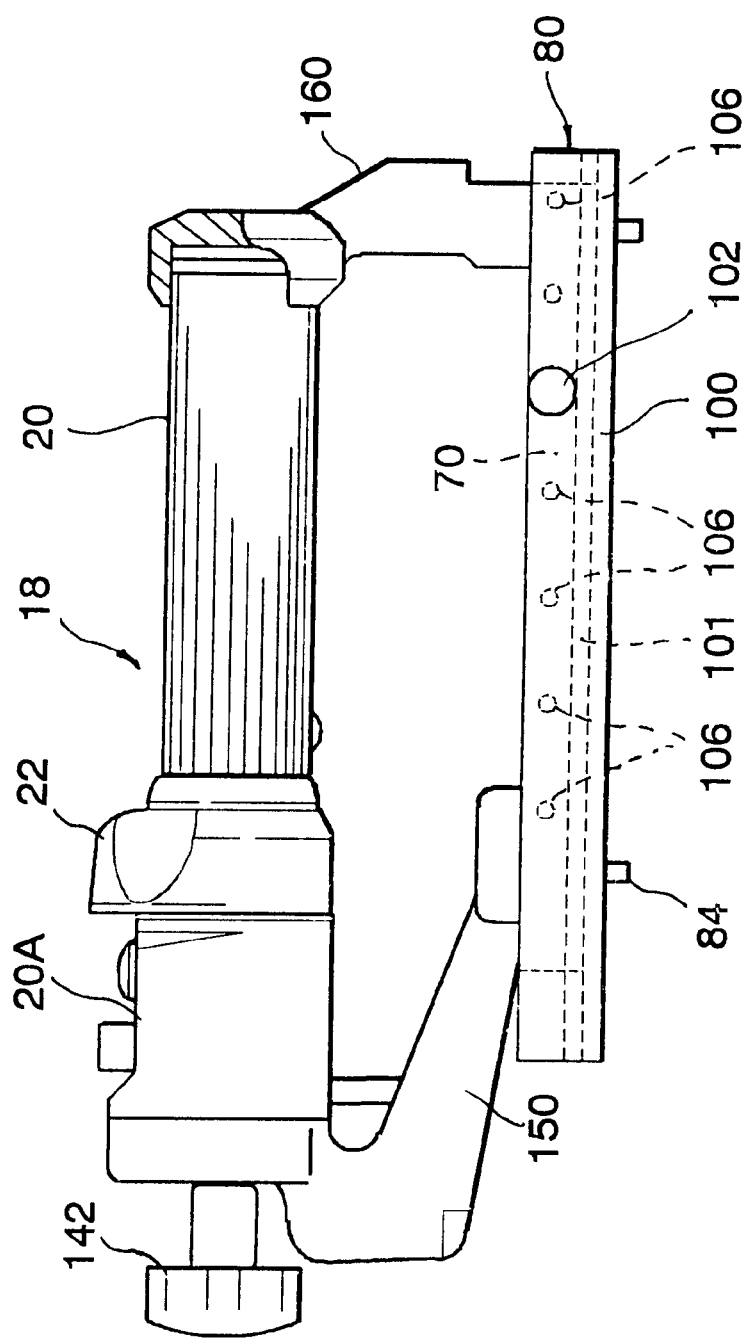
FIG. 17 is a side view of a variation of a linkage mechanism between the fixture and the adapter.
Figure 18:
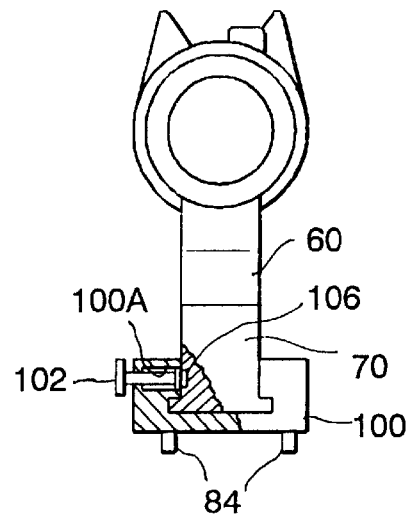
FIG. 18 is a rear view of the variation of a linkage mechanism between the fixture and the adapter.

The grip rod 20 can be turned about its axis in opposite directions by loosening the front fixture knob 142. Accordingly, as shown in FIG. 16, the finger stop 22A is located in an angular position suitable for easy operation of the photographer by turning the grip rod 20.

Figure 19:
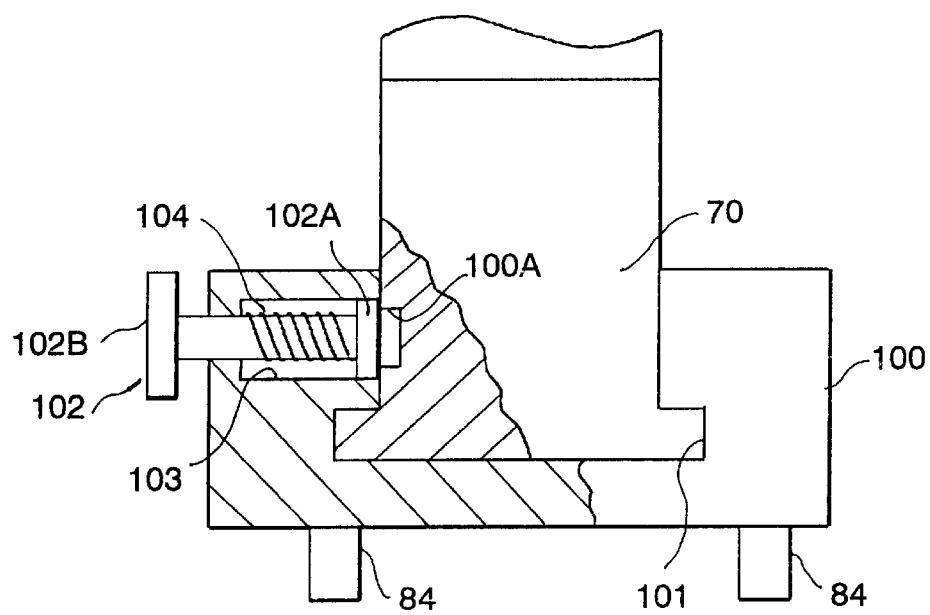
FIG. 19 is an enlarged view of an essential part of a locking mechanism showing locking the fixture to the adapter.
Figure 20:
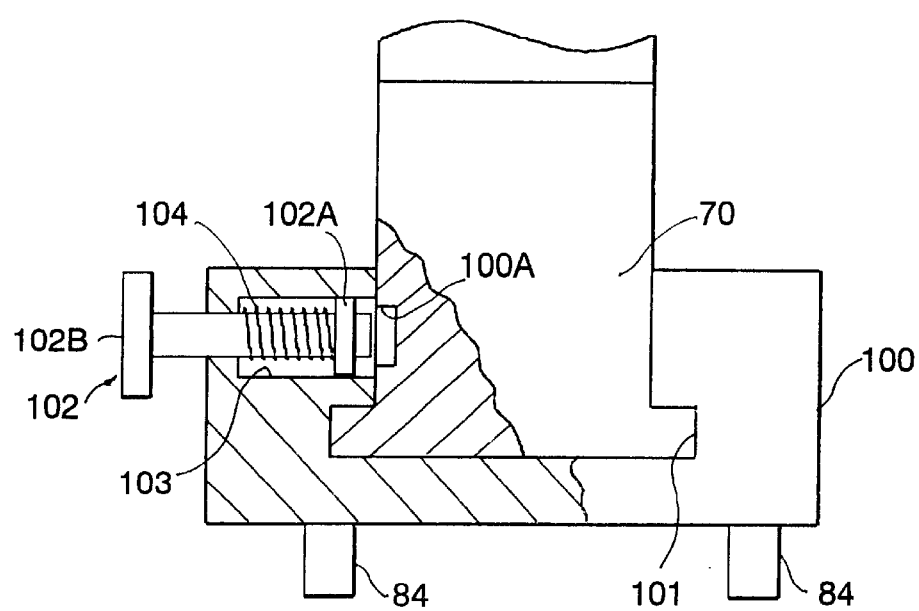
FIG. 20 is an enlarged view of the essential part of the locking mechanism showing allowing the fixture to slide relative to the adapter.

FIGS. 17 through 20 show a variation of the low-angle grip device 18 in accordance with an embodiment of the invention. A base slider 70 at one of its opposite sides of the low-angle grip device 18 is formed with circular recesses 106 at regular axial intervals. An adapter 80 comprises a base guide rail 100 formed with a generally T-shaped guide groove 101 in which the base slider 70 slides and a bore 103 in one of side walls thereof. A spring loaded fixing pin 102 is fitted in the bore 103. As shown in FIGS. 19 and 20 in detail, the fixing pin 102 is provided with a head 102B and a spring retainer 102A. A return spring 104 is mounted on the stem of the fixing pin 102 between the sprint retainer 102A and a side wall of the base guide rail 100. The inner end of the fixing pin 102 is forced into one of the recesses 106 of the base slider 70 of the low-angle grip device 18.

When the fixing pin 102 is pulled against the return spring 104 to bring its inner end out of the recess 106 of the base slider 70, the low-angle grip device 18 is allowed to slide in the axial direction. The fixing pin 102 is released to enter another recess 106 to fix the low-angle grip device 18 at a desired axial position.

Figure 21:
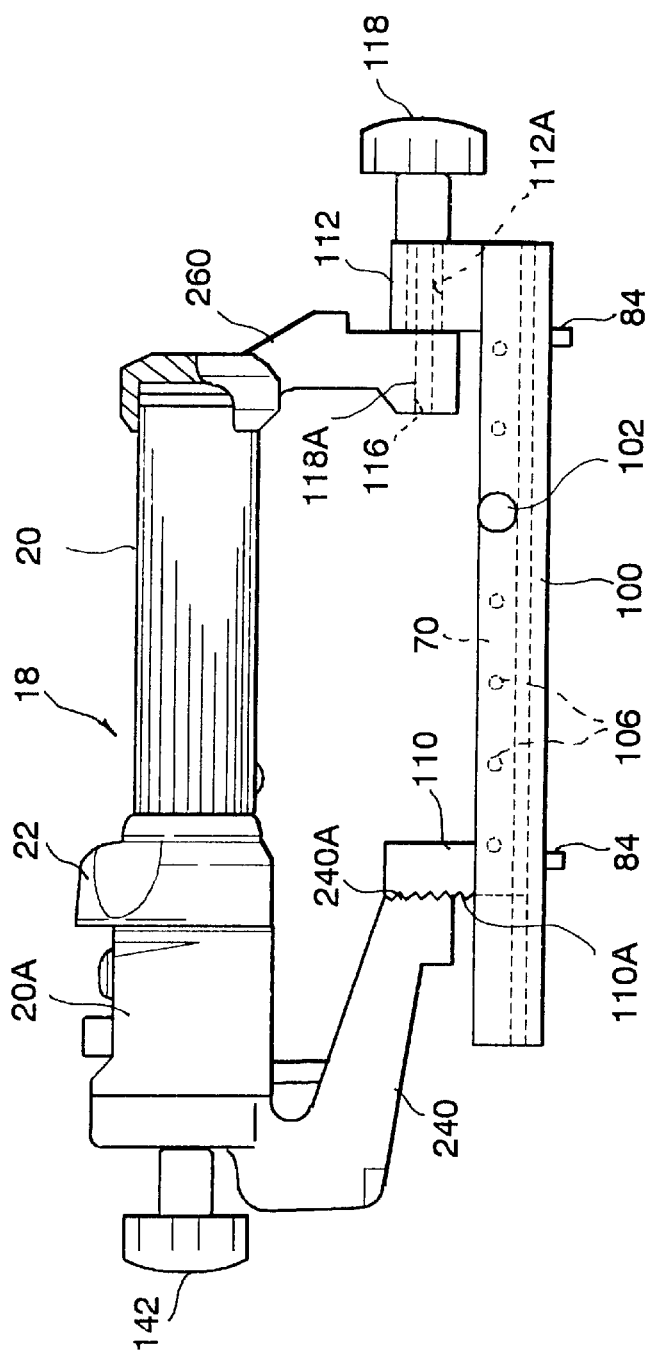
FIG. 21 is a side view showing a variation of the fixture.

FIG. 21 shows another variation of the low-angle grip device 18 in accordance with an embodiment of the invention. The low-angle grip device 18 includes a front support 240, a rear support 260 and a base slider 270 which are separately provided. The base slider 270 at its opposite ends is provided with a front engaging post 110 and a rear engaging post 112, both posts 110 and 112 extending upright from the base slider 270. The front engaging post 110 is formed with saw-teeth 110A engageable with saw-teeth 240A formed on the front support 240. The rear engaging post 112 is formed with an axial bore 112A enlarged vertically through which a threaded rod 11 BA of a fixing knob 118 passes. The threaded rod 118A of the fixing knob 118 engages with a threaded axial bore 116 formed in the rear support 260.

Before attaching the low-angle grip device 18 to the ENG camera body 12 with the adapter 100 secured thereto, the base slider 270 is slid in the axial direction and adjusted in a desired axial position relative to the ENG camera body 12. The low-angle grip device 18 is subsequently attached by attaching the front support 240 to the front post 110 by means of engagement of saw-tooth 110A and 240A thereof and aligning the threaded axial bore 116 of the rear support 260 and the fixing knob 118 with each other, and then the fixing knob 118 is fastened into the threaded axial bore 116. In this manner, the low-angle grip device 18 is attached in the desired position relative to the ENG camera body 12. If necessary to change the grip rod 20 in vertical position upward or downward, the engagement between the saw-teeth of the front support 240 and the front post 110 is shifted upward or downward. At this time, the fixing knob 118 is shifted in the vertically enlarged axial bore 112A.

According to the low-angle grip device according to the second embodiment of the invention which is attached to the ENG camera body not directly but through the adapter, it is possible to attach the low-angle grip device to different types of ENG cameras by preparing various types of adapters fitting to the ENG cameras, respectively. Accordingly, the low-angle grip device is capable of wide application.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. A low-angle grip device for holding an ENG camera in a desired low-angle position, said ENG camera low-angle grip device comprising:

a grip rod arranged above a top of the camera;

remote controlling means installed to a front end portion of said grip rod for remotely operating a camera lens system; and grip rod support means for adjusting an angular position of said grip rod relative to an optical axis of said camera lens system and supporting said grip rod in said adjusted angular position;

wherein said grip rod supporting means comprises end fixtures one of which is mounted on a top of said ENG camera and pivotally supports one end of said grip rod and another of which is pivotally mounted on said top of said ENG camera and disengageably forced against another end of said grip rod to secure said grip rod in position.

2. The ENG camera low-angle grip device as defined in claim 1, wherein said another fixture is provided with saw-teeth engageable with said one end of said grip rod.

3. The grip device of claim 1, wherein the grip rod support means extends from a top surface of the camera.

4. A low-angle grip device for holding an ENG camera in a desired low-angle position, said ENG camera low-angle grip device comprising:

a grip rod;

remote controlling means installed to a front end portion of said grip rod for remotely operating a camera lens system;

grip rod support means for fixedly supporting said grip rod;

a base adapter detachably secured to a top of said ENG camera for detachably mounting said grip rod support means thereon for sliding movement; and fixing means for fixing said grip rod support means to said base adapter in a desired position.

5. The ENG camera low-angle grip device as defined in claim 4, wherein said grip rod supporting means comprises a front support engageable with a front end of said grip rod and a rear support engageable with a rear end of said grip rod connected as one whole by means of a generally T-shaped base slider, and said base adapter has a generally T-shaped guide groove in which said generally T-shaped base slider slides.

6. The ENG camera low-angle grip device as defined in claim 4, wherein said ENG camera is equipped with a motor drive unit for driving a zoom lens system and said remote controlling means is electrically connected to said motor drive unit for remotely driving said camera lens system.

7. The low-angle grip device for an ENG camera as defined in claim 6, wherein said remote controlling means comprises a zooming thumb ring supported for rotation on said grip rod and an angular position sensor for detecting an angular position of said zooming thumb ring and sending a signal representative said angular position to said motor drive unit to actuate a motor of said motor drive unit according to said signal incoming from said angular position sensor for zooming motion of said zoom lens system.

* * * * *